United States Patent [19]
Clermont et al.

[11] Patent Number: 5,139,669
[45] Date of Patent: Aug. 18, 1992

[54] APPARATUS WITH HOLLOW FIBRES

[75] Inventors: Christian Clermont, Morance; Charles Pous, Lyons; Julien Porta, Chavanoz; Jean-Claude Riquier, Rilleux, all of France

[73] Assignee: Hospal Industrie, Meyzieu, France

[21] Appl. No.: 652,643

[22] Filed: Feb. 8, 1991

[30] Foreign Application Priority Data

Feb. 9, 1990 [FR] France ............................. 90 01794

[51] Int. Cl.⁵ .............................................. B01D 63/02
[52] U.S. Cl. ............................ 210/321.8; 210/321.89
[58] Field of Search ........... 210/321.6, 321.72, 321.78, 210/321.79, 321.8, 321.87, 321.88, 321.89

[56] References Cited

U.S. PATENT DOCUMENTS 4,179,380 12/1979 Amicel et al. .
4,708,796 11/1987 Yoshimoto et al. .
4,830,383 5/1989 Probst .

FOREIGN PATENT DOCUMENTS 0080661 6/1983 European Pat. Off. .
3435883 4/1986 Fed. Rep. of Germany .

Primary Examiner—Frank Sever
Attorney, Agent, or Firm—Finnegan, Henderson, Farabow, Garrett & Dunner

[57] ABSTRACT

The invention relates to an apparatus with hollow fibres, comprising: an elongate enclosure (41) at both ends of which there is a partition (48) supporting the open ends of a bundle of hollow fibres (47), the enclosure (41) being closed at each of its ends by a cover (50).

This apparatus is characterized in that it comprises a circular resin-based seal (55) arranged on the periphery of the partition (48) and in the proximity of the hollow fibres (47), this seal (55) forming to the inside of the enclosure a concave connecting surface (56) joining without substantial break of continuity the inner surface (52) of the cover (50) to the partition (48) or to the end surface (49) of the enclosure.

This apparatus can be used in particular as an artificial kidney.

13 Claims, 5 Drawing Sheets

APPARATUS WITH HOLLOW FIBRES

The present invention relates to an apparatus with hollow fibres, which can be used in particular as an artificial kidney.

Figure 1:
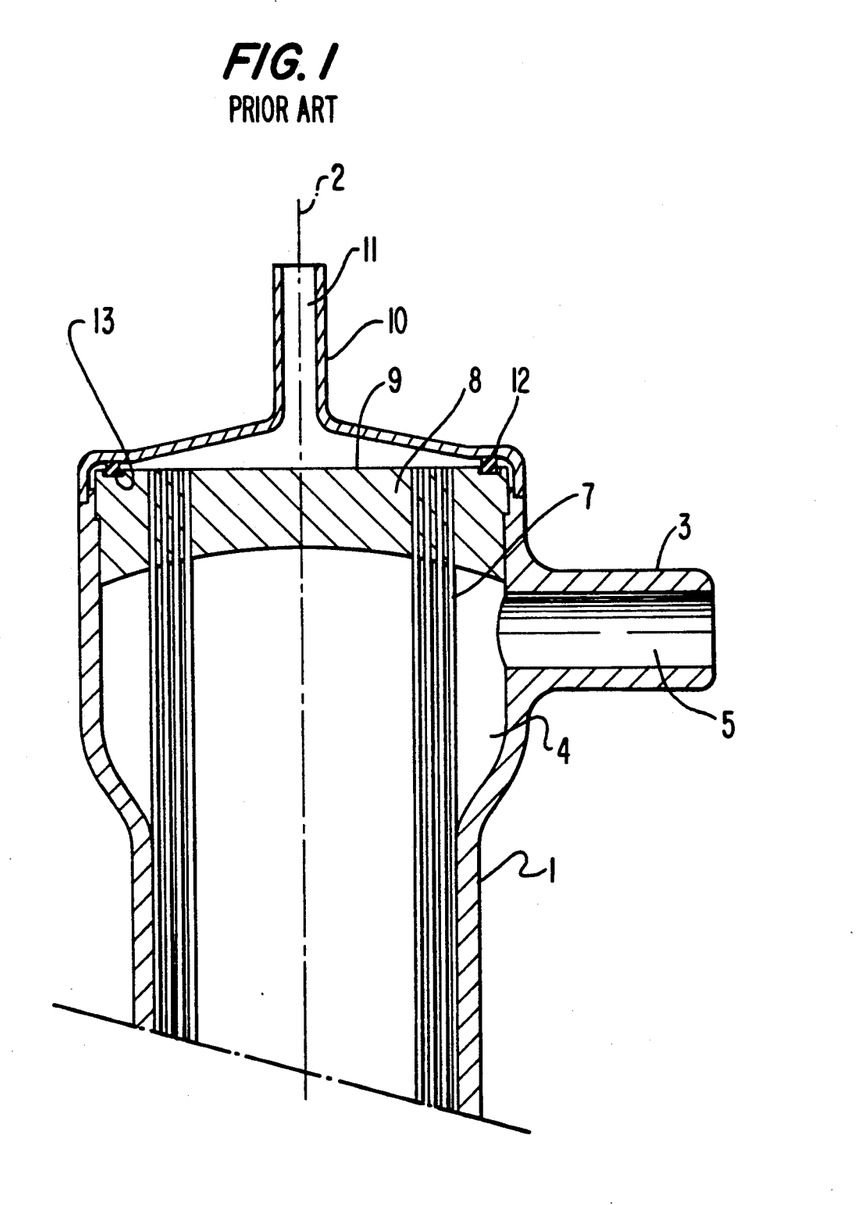
FIG. 1 shows the prior art.

Apparatuses with hollow fibres are well known. An example which may be mentioned is the apparatus with semipermeable hollow fibres described in French Patent No. 2,553,674. One end of an apparatus according to that patent is shown in section along its longitudinal axis in FIG. 1. The dot-and-dash line (2) represents the longitudinal axis of this apparatus. This apparatus comprises:

an elongate enclosure (1) at both ends of which there is a partition (8) supporting the ends of the hollow fibres (7) extending axially inside the enclosure (1), the open end of the hollow fibres (7) generally being in the same plane as that of the face (9) of each partition (8) at the outside of the enclosure (1), the partition likewise serving to separate the fluid circulating inside the hollow fibres from that circulating outside the hollow fibres, a cover (10) at each end of the enclosure (1), each of the covers comprising a port (11) for the admission or the discharge of the fluid circulating inside the hollow fibres (7), at least one port (3) for the passage of a fluid between the outer wall of the hollow fibres (7) and the outside of the enclosure (1), making it possible to bring the inner part (4) of the enclosure (1) into communication which the outside of the enclosure (1) by way of an inner channel (5) in the port (3).

One of the main problems encountered in the manufacture of apparatuses with hollow fibres arises from the difficulty experienced in obtaining at the same time a leakproof and reliable assembly of the cover between the partition and the enclosure as well as a good return of the fluid circulating inside the hollow fibres.

According to French patent No. 2 553 674, the leakproofness between the cover and the partition is ensured by means of an O-ring seal (12) arranged in a groove (13) made in each partition (8).

The main defect in this type of assembly is, during clinical use of the apparatus, formation of a ring of fibrin and/or of coagulated blood at the periphery of the zone communicating with the inside of the fibres, and principally between the seal and the groove. The return of the blood and in particular of red blood cells to the patient is consequently imperfect and more often than not causes a haematocrit drop. in addition, the presence of a peripheral ring can cause blocking of the peripheral hollow fibres. Moreover, the seal tends gradually to become deformed by creep, especially under the effect of the grip pressure stresses. The direct consequence of this creep is the loss of leakproofness, which is reflected particularly in the infiltration of blood at the periphery between the cover and the partition. The use of a seal made of plastic material of high quality, but costly, alone makes it possible to eliminate the deformation of the seal by creep.

Some techniques recommend combining several complementary leakproofing means in order to achieve satisfactory leakproofness.

Figure 2:
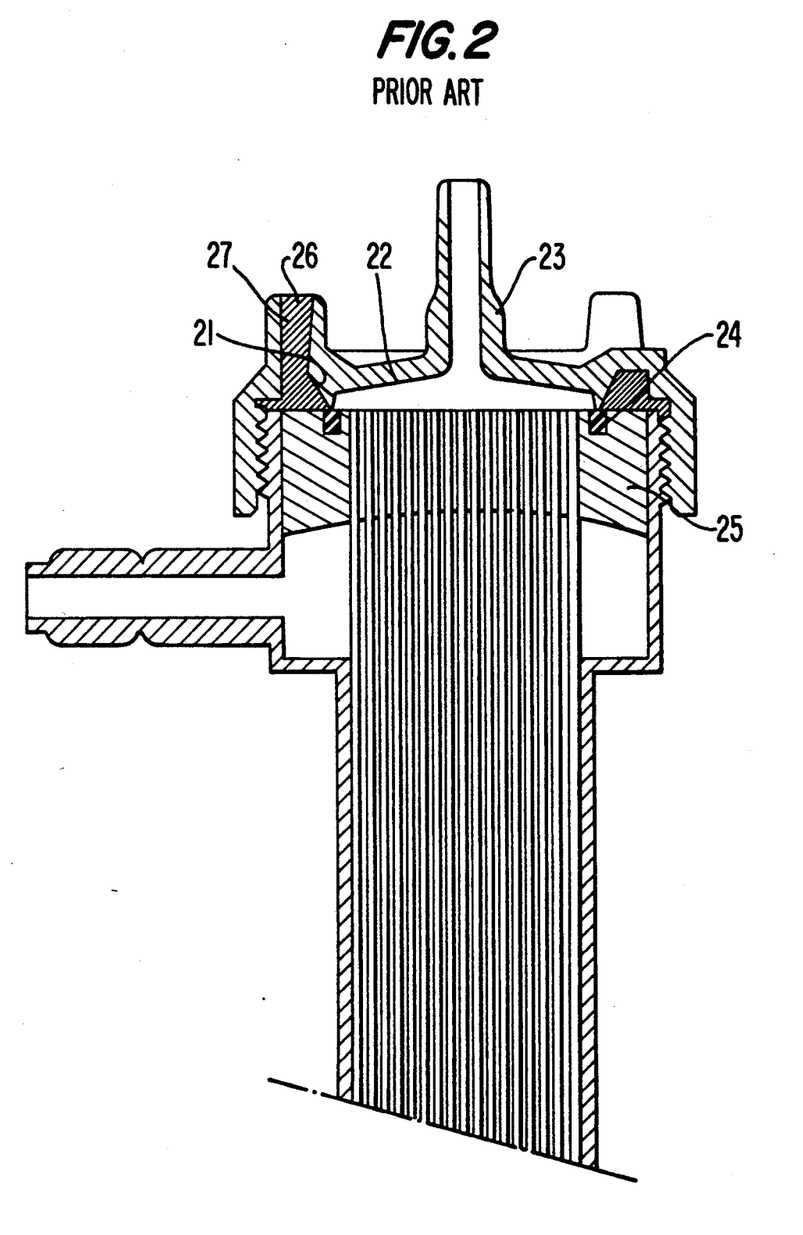
FIG. 2 shows the prior art.

For example, in some types of dialyers, the leakproofness is achieved with the aid of so-called "primary" leakproofing means and so-called "secondary" leakproofing means. One end of such a dialyser is shown diagrammatically in FIG. 2. According to FIG. 2, the "primary" leakproofing means consist of an annular shoulder (21) formed on the inner surface (22) of the cover (23) and bearing on a ring (24) of plastified polyvinyl chloride inserted into the partition (25). The "secondary" leakproofing means consist of a seal (26) made of silicone and accommodated in a circular groove (27). The essential function of the "primary" leakproofing means is to ensure leakproofness during manufacture of the apparatus with hollow fibres, when the silicone, in the liquid state, is introduced into the groove (27), in order to protect the hollow fibres. The "primary" leakproofing means eventually no longer function due to the creep of the polyvinyl chloride under the action of the grip forces. In addition to their complexity, a major disadvantage of these dialysers is the presence of a ring of coagulated blood and/or of fibrin at the periphery between the cover and the partition, which results in a poor return of blood to the patient, which causes a haematocrit drop.

Various other techniques for achieving leakproofness are currently used, such as welding or gluing the cover to the enclosure. However, with these techniques it is not possible to avoid the formation of a deposit of coagulated blood and/or of fibrin at the periphery of the bundle of fibres. Moreover, as regards the technique of assembly by gluing, there is a major disadvantage with respect to its reproducibility of assembly and its feasibility. Namely, difficulties in distributing the glue uniformly in the cover/enclosure gap, which can lead to infiltration of blood into the zone where there is a lack of glue and to blocking of the peripheral fibres in the zone where there is too much glue.

The object of the present invention is therefore to propose an apparatus with hollow fibres which does not have the abovementioned disadvantages.

That is to say, one object of the present invention is an apparatus with hollow fibres which promotes the return to the patient, and in particular makes it possible to avoid formation of deposits of coagulated blood and/or fibrin at the periphery of the fibres.

Another object of the invention is an apparatus with hollow fibres which guarantees satisfactory and reliable leakproofness without any risk of escape of fluids during the assembling of the cover to the enclosure.

Another object of the invention is an apparatus with hollow fibres which is leakproof, reliable and effective and is produced using simple technical means and at a moderate cost.

in order to achieve these objects, the present invention proposes an apparatus with hollow fibres which can be used in particular as an artificial kidney, comprising:

an elongate enclosure at both ends of which there is a partition supporting the ends of the hollow fibres extending axiallly inside the enclosure, the open end of the hollow fibres generally being in the same plane as that of the face of each partition at the outside of the enclosure, the partition likewise serving to separate the fluid circulating inside the hollow fibres from that circulating outside the hollow fibres, the enclosure comprising at least one port for the passage of a fluid between the outer wall of the hollow fibres and the outside of the enclosure, a cover at each end of the enclosure, each of the covers comprising a port for the admission or the discharge of the fluid circulating inside the fibres, and, if appropriate, means for ensuring the mechanical connection of the cover to the enclosure, and characterised in that the apparatus with hollow fibres likewise comprises at each of its ends, at the periphery of the partition, a circular resinbased seal forming, to the inside of the enclosure, a concave-shaped surface of connection joining without substantial break of continuity the inner surface of the cover to the partition or the end surface of the enclosure.

Such a concave surface of connection creates between the partition or the end surface of the enclosure and the inner surface of the cover a good continuity of form, which thus considerably improves the circulation of the fluid inside the chamber formed between the partition and the cover and in particular at the periphery of this chamber. Indeed it is observed that, with such a concave surface of connection, the deposits of coagulated blood and/or of fibrin for example at the periphery are minimised.

in addition, the leakproofness between the partition, the enclosure and the cover in the apparatus with hollow fibres according to the invention is satisfactory.

The resin chosen is advantageously the material constituting the partition. Similarly, a biocompatible resin is chosen when the apparatus according to the invention is intended for medical use, for example as an artificial kidney. Thus, by reducing the number of different materials in contact with the biological fluids, the risks of a sensitivity reaction in the patients are reduced.

According to a first preferred embodiment, the apparatus with hollow fibres according to the invention is also provided with:
  at least one circular rib on the inner surface of the cover,
  and at least one circular groove for receiving at least part of the circular rib, this groove being made in the partition,
and the gap between the rib and the groove is filled with a resin which, in the polymerised state, forms a concave-shaped surface of connection joining without substantial break of continuity the cover to the partition.

In order to, form the concave-shaped connecting surface, a quantity of resin is poured into the groove such that the positioning of the rib causes a controlled overflow of resin which, on polymerising, gives rise to a concave meniscus joining the inner surface of the cover to the partition. With the aid of this particular configuration it has been possible to obtain high values for the radius of curvature of the connecting surface, while at the same time promoting a good continuity of form between the inner surface of the cover and the partition.

Similarly, this particular configuration has made it possible to control the location of the connecting surface inside the inner chamber defined between the partition and the inner surface of the cover. It is principally the location of the groove in the partition (and of course of the rib) which determines the location of the connecting surface. Advantageously, by virtue of this particular configuration, it is possible to locate the connecting surface in the proximity of the ends of the peripheral hollow fibres without risk of occluding the latter.

This results in eliminating the zones where the fluid is replaced with difficulty and, thus, in improving the circulation of the fluid in this chamber. Indeed, by virtue of this particular configuration, the best performances as regards return of the fluid circulating in the hollow fibres have been obtained. In the field of haemodialysis, in particular, this configuration makes it possible to avoid the deposition of coagulated blood and/or of fibrin and thus contributes to improving the return of blood to the patient.

By virtue of this embodiment, the connecting surface can be made with good reproducibility.

In addition, on account of its zigzag shape, and consequently its large surface area, the contact surface formed by way of the groove and the rib between the cover and the partition contributes to achieving the adhesion between these two elements. In this case it is not generally necessary to provide mechanical connection means for obtaining the adhesion between the cover and the enclosure.

The zigzag-shaped gap in the apparatus according to the first embodiment of the present invention adds further to the leakproofness and thus contributes to its reliability.

The gap between the groove and the rib is preferably narrow, in order to further strengthen the adhesion and the leakproofness.

Again preferably, an asymmetrical engagement of the rib in the groove is provided. In other words, the gap formed between the outer wall of the groove and the rib is narrower than the gap formed between the rib and the inner wall of the groove (wall located in the direction of the fibres). This positioning advantageously contributes to the overflow of the resin and to the formation of the concave-shaped connecting surface.

A supplementary circular rib is advantageously provided to the outside of and in the proximity of the circular groove, and the height of this rib must be lower than the plane constituted by the face of each partition at the outside of the enclosure. In the remainder of the description, this rib will be referred to as the "outer rib".

The outer rib essentially serves to control the quantity of resin deposited in the groove. In this case it is advantageous to work with a constant volume of resin and with an excess. Thus, during positioning of the rib in the groove, by virtue of the outer rib the overflow of the resin out of the groove is well controlled. Indeed, on the side towards the fibres, the overflow of the quantity of resin necessary for the formation of the concave connecting surface is obtained, the slight excess of resin being removed on the other side beyond the outer rib. It goes without saying that the excess of resin must be calculated, so as not to cause any flow of resin between the cover and the enclosure of the apparatus. Consequently, the presence of the outer rib facilitates the manufacture of the apparatus according to the invention and further improves the reproducibility thereof.

Similarly, the outer rib constitutes a limit of the leakproofness zone particularly favourable to the quality of the leakproofness.

According to a second embodiment of the apparatus with hollow fibres according to the invention, the following steps are carried out:
  assembling the cover and the enclosure by any known means such as, for example, by ultrasound welding, by snap-fastening, by screwing or by gluing, in such a way as to produce a leakproof lateral contact at the periphery between these two pieces,
  rotating the apparatus with hollow fibres about its axis (corresponding to the axis of the enclosure),
  and, simultaneously, injecting and centrifuging a specific quantity of resin with the aid of an elbow conduit via the branch of each cover, this branch being provided for the admission or the discharge of a fluid circulating inside the hollow fibres, the rotation being maintained at least until the resin forms a gel.

By virtue of this embodiment, the resin is distributed in a ring in a uniform manner and, on polymerising, forms a leakproofing seal between the cover and the enclosure, which seal exhibits, to the inside of the enclosure, a concave meniscus between the inner surface of the cover and the periphery of the partition.

Similarly, such an embodiment has made it possible, during clinical use of the apparatus, to improve the return of blood to the patient, the formation of deposite of coagulated blood and/or of fibrin being minimised.

According to a third embodiment of the invention, the wall of the enclosure comprises, at each of its ends, an outer clearance forming a circular bearing surface for a corresponding circular shoulder formed in a cover intended to be fitted on the enclosure. The gap between the enclosure and the cover is filled with a resin which, in the polymerised state, forms a leakproofing seal between the enclosure and the cover, which seal exhibits, to the inside of the enclosure, a concave connecting surface joining without substantial break of continuity the end surface of the enclosure to the inner surface of the cover.

According to the invention, in order to form a leakproofing seal between the enclosure and the cover (and where appropriate to secure the cover to the enclosure), a string of resin is deposited on the clearance surface of the enclosure or on the inner lateral surface of the cover intended to be fitted on the enclosure, and the cover is fitted on the enclosure, the quantity of resin deposited being adapted in such a way that it overflows to the inside of the enclosure, a little beyond the level of the end of the enclosure.

On polymerising, the resin forms a leakproof seal between the enclosure and the cover, which seal exhibits, to the inside of the enclosure, a uniform concave surface joining the inner surface of the cover to the end surface of the enclosure. The description of the apparatus according to the present invention will be better understood with the aid of the attached figures which illustrate diagrammatically, by way of non-limiting examples, embodiments of and methods of obtaining such an apparatus.

Figure 3:
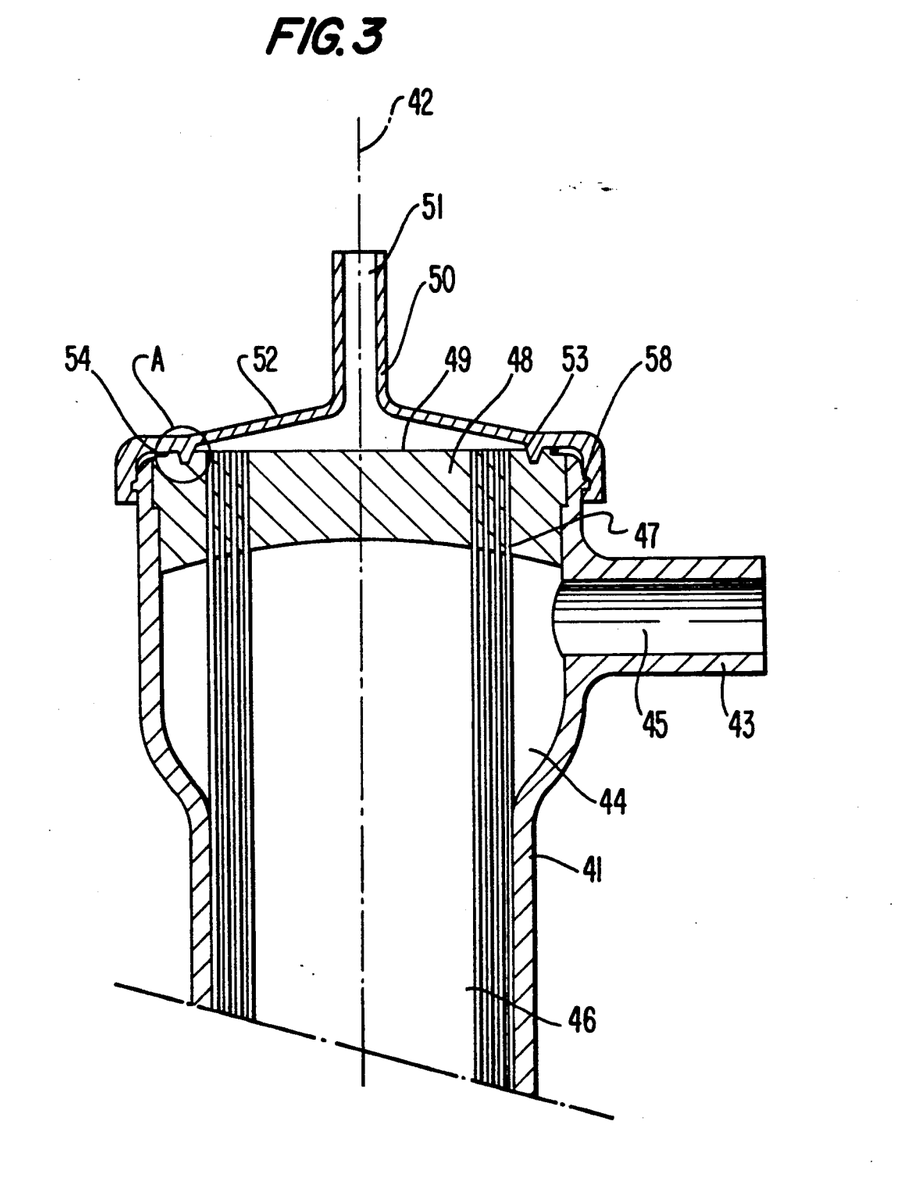
FIG. 3 shows in section, along its longitudinal axis, one end of an apparatus with hollow fibres according to the first embodiment of the present invention.

The apparatus, according to FIG. 3, of which only one end has been shown in order to simplify the drawing, but which in fact advantageously comprises two substantially identical ends, comprises an enclosure (41), generally made of plastic material, preferably transparent, for example polycarbonate. This enclosure (41) or rigid envelope is generally of elongate shape, the dot-and dash line (42) representing the longitudinal axis of the enclosure (41). This enclosure (41) comprises a side port (43) making it possible to bring the inner part (44) of the enclosure (41) into communication with the outside of the enclosure (41) by way of an inner channel (45) in this port (43). The enclosure (41) is advantageously of circular cross-section and comprises on the inside a bundle (46) of semipermeable hollow fibres (47), of which only those on the circumference of the bundle have been shown in order to simplify the drawing. Thus, the diameter of the bundle (46) of hollow fibres (47) corresponds substantially to the inner-cross section of the enclosure (41) over most of the length of the latter, except towards its ends. Indeed, when the apparatus according to the present invention is used in haemodialysis, the inner cross-section of the enclosure (41) is wider towards the ports (43) so as to permit better distribution of the fluid circulating outside the fibres (47), this fluid being most of the time dialysate, while the blood circulates inside the fibres (47). The end of the enclosure terminates in a partition (48) in which the ends of the outer walls of the hollow fibres (47) are embedded. The open ends of the hollow fibres (47) emerge at the face (49) of the partition (48) at the outside of the enclosure (41). Thus, the inner part of each hollow fibre (47) is in communication with the outside of the enclosure.

Each partition (48) is generally made of a hardened polymeric material, taking the place of a leakproofing wall at each end of the enclosure (41). Each partition (48) in fact adheres in a leakproof manner to the end of the inner wall of the enclosure (41) and to the outer wall of each fibre (47) towards its ends. Known polymeric materials which can be used for producing these partitions (48) and which may be mentioned in particular are epoxy resins or polyurethane-based resins.

Each end of the apparatus according to the present invention comprises a cover (50), generally called a header by specialists, which comprises an inner channel (51) for introduction or removal of the fluid circulating inside the hollow fibres (47).

Figure 4:
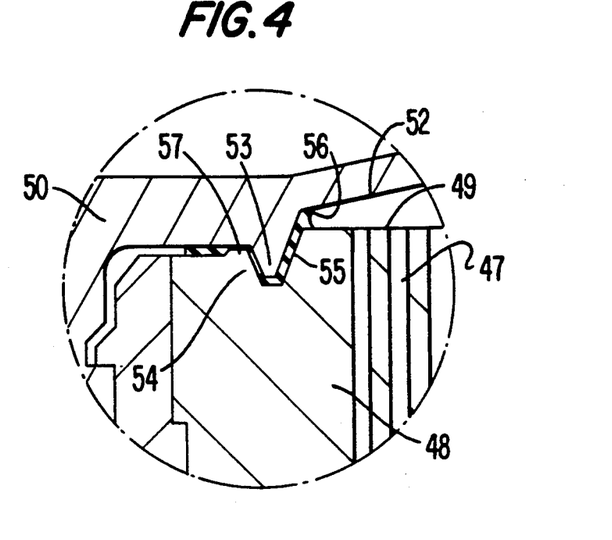
FIG. 4 shows an enlargement of detail A in FIG. 3.

FIG. 4 shows how the cover (50) is connected to the end of the enclosure (41).

According to the present invention, the cover (50) comprises on its inner surface (52) a circular rib (53) which engages in a circular groove (54) provided for this purpose on the face (49) of the partition (48). This groove (54) is situated between the circumference of the partition (48) and the open ends of the hollow fibres (47) on the face (49) of the said partition (48). This groove (54) advantageously has a trapezoidal cross-section and its opening is slightly wider than its base.

The gap between the rib (53) and the groove (54) is filled with a resin forming, after polymerisation, a circular seal (55).

The seal (55) obtained is delimited laterally by a concave-shaped connecting surface (56) joining without substantial break of continuity the cover (50) to the partition (48), and by an outer rib (57) provided on the partition (48) in the proximity of the groove (54).

As specified above, in order to facilitate the overflow of the resin which, on crosslinking, forms the connecting surface (56), an eccentric assembly of the rib (53) in the groove (54) is provided.

The resin chosen will preferably be a resin having sufficient wettability qualities on the material constituting the partition (48) and on that of the cover (50). However, the overflow of resin caused by the positioning of the rib (53) in the groove (54) promotes the wetting of these materials and thus permits the use of resins whose capacity to wet these materials is weaker. In the case where the apparatus with hollow fibres according to the present invention is intended for medical use, such as haemodialysis, the resin chosen must in addition be biocompatible. Moreover, a glue is preferably chosen especially in the case where the seal (55) must also ensure, at least partially, the mechanical connection of the cover (50) to the partition (48) and the enclosure (41). By way of example, mention may be made of polyurethanes such as aliphatic polyurethanes, or silicones. The resin chosen will preferably be the material constituting the partition.

Referring to FIG. 3, it will be seen that a snap-fastening (58) is provided in order to ensure the mechanical connection between the cover (50) and the enclosure (41). In this case the outer rib (57) also ensures fixation of the geometry of the assembly by tensioning the snap-fastening (58).

Figure 5A:
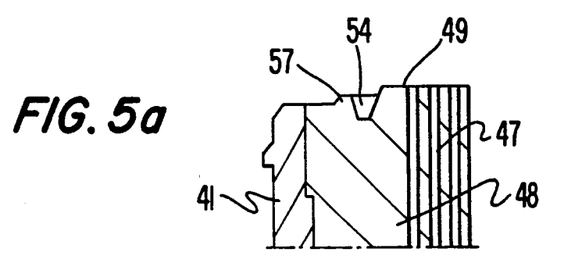
FIGS. 5a, 5b, 5c show, in section, a manner of operating so as to achieve detail A shown in FIG. 4.
Figure 5B:
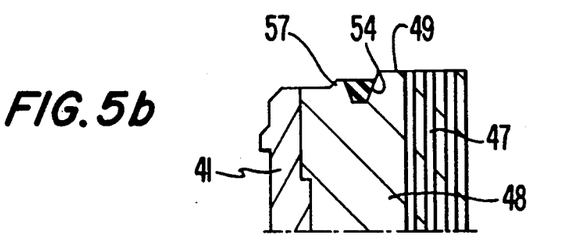
Figure 5C:
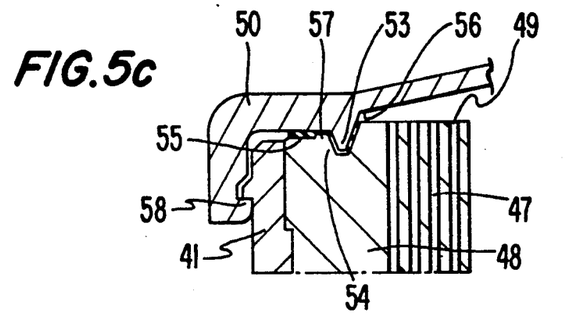

FIGS. 5a, 5b and 5c show how the apparatus according to FIGS. 3 and 4 can be obtained for producing the connecting surface (56).

For the preparation of the apparatus according to the present invention, such as is shown partially in FIG. 5a, reference may be made in particular to French Patent 2,533,674.

The shape of the partition (48) is obtained by moulding of the polymeric material during polymerisation and by slicing. The moulding permits manufacture of the periphery of the partition (48) and in particular the outer rib (57) and the groove (54). The face (49) of the partition (48) in which the ends of the hollow fibres (47) emerge is obtained by slicing, and the level of the face (49) is fixed at a higher level than that of the outer rib (57).

After slicing, as shown in FIG. 5b, a resin, preferably fast-setting, is poured into the groove (54).

The cover (50), which comprises the rib (53). is then put into position and fixed on the enclosure (41) by means of a snap-fastening (58). This assembly is facilitated by the presence of the rib (53) and of the groove (54).

The overflow of resin caused by this positioning results in the wetting of the partition (48) and of the cover (50) in the proximity of the groove (54), and simultaneously in the formation of a concave meniscus between these two elements which is, in the present description, referred to as the connecting surface (56). The latter, by providing continuity of form between the elements, promotes good circulation of the fluids, permits elimination of deposits on the periphery and consequently guarantees a good return.

By way of example, an apparatus such as that shown in FIG. 3 has been obtained by using an enclosure and a cover of polycarbonate, a polymeric material for the partition of polyurethane, a glue based on aliphatic polyurethane.

Figure 6:
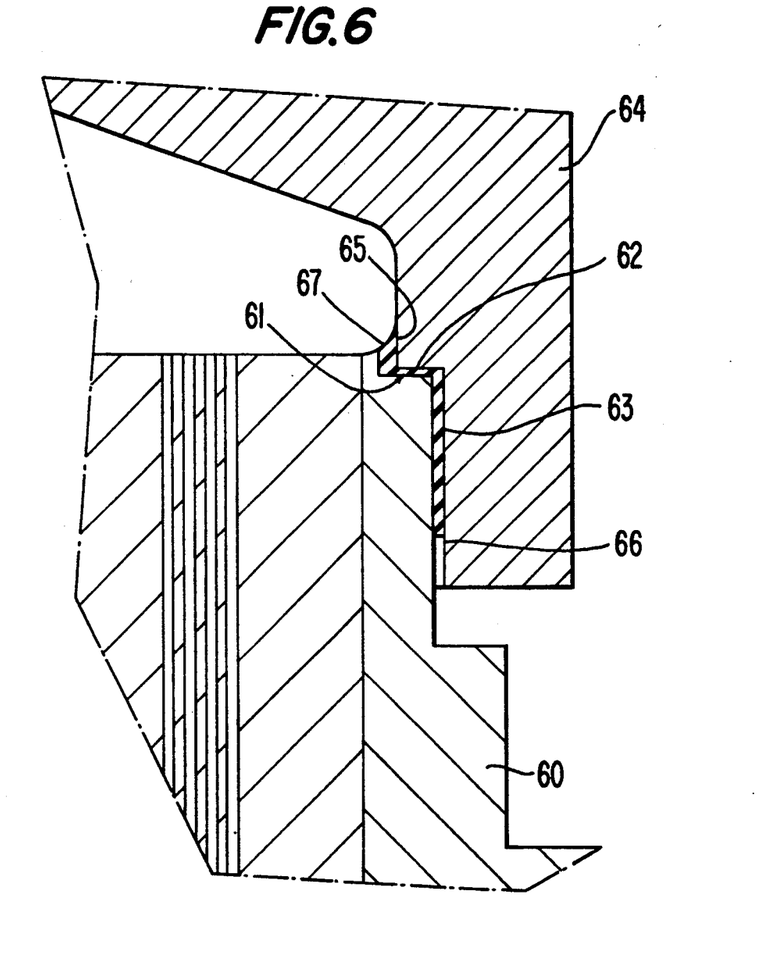
FIG. 6 shows, in section, part of one end of an apparatus with hollow fibres according to the third embodiment of the present invention.

FIG. 6 shows a particular design according to the third embodiment of the invention.

In order to facilitate understanding, the dimensions have been deliberately exaggerated and only part of one end of the apparatus according to the invention has been shown.

The inner wall of the tubular enclosure (60) comprises at each of its ends a radial circular bearing surface (61) for a corresponding circular shoulder (62) formed on the inner lateral surface (63) of the cover (64).

Advantageously, in order to form a leakproofing seal (65) between the enclosure (60) and the cover (64), a string of resin is deposited on the end (66) of the inner lateral surface (63) of the cover (64) intended to be fitted on the enclosure (60), and the cover (64) is fitted on the enclosure (60).

The quantity of resin deposited is adjusted, on the one hand, in such a way as to overflow a little to the inside of the enclosure (60) and to form, on polymerising, a concave connecting surface (67) between the enclosure (60) and the cover (64), and, on the other hand, to secure the cover (64) to the enclosure (60) by gluing. In this case it is not necessary to provide a supplementary mechanical connection means.

A number of alternatives for producing the apparatus according to the present invention which are within the scope of the expert may be envisaged. By way of example, the cross-section of the enclosure can be oval or even flattened with rounded edges. As regards the covers of the apparatus, they can also be fixed to the enclosure by screwing. In this case the outer rib (57), provided in the first embodiment of the invention, can serve as a stop.

As regards the bundle of hollow fibres, it can comprise hollow fibres gathered in a braid or even coiled about a central mandrel, it being possible for the latter in certain cases to serve for the admission or removal of the fluid circulating outside the hollow fibres.

As regards the first embodiment of the invention, the cross-section of the groove (54) can of course be chosen other than trapezoidal, as previously described.

Similarly, for the first embodiment of the invention, other configurations of assembly between the cover and the partition equivalent to that shown in FIGS. 3, 4 and 5 may be envisaged. By way of example, a plurality of ribs can be provided on the inner surface of the cover on the periphery, one groove being provided for each rib on the partition. Alternatively, provision can be made for the ribs to be engaged in one and the same groove likewise provided on the partition. The configuration shown in FIGS. 3, 4 and 5 is however preferred on account of its simplicity and its efficacy in guaranteeing leakproofness and preventing deposits.

Whatever the embodiment used, the apparatus according to the present invention can have very diverse uses in the field of medical engineering. It suffices to adapt the known suitable hollow fibres for the envisaged application. It can be used, for example, in haemodialysis, the blood preferably circulating inside the fibres, while the dialysis fluid circulates outside the fibres via the two side ports (43). This apparatus can be used as an artificial lung, the blood circulating inside the fibres (47), while the gaseous mixture containing oxygen circulates outside the fibres.

This apparatus can be used as an artificial kidney in ultrafiltration, without haemodialysis, and in this case only one port is necessary on the enclosure (41) for the recovery of the ultrafiltrate. The same applies to plasmapheresis operations during which the blood circulates inside the fibres.

We claim:

1. A hollow fiber apparatus, comprising:
    an elongated body including an enclosure having at least one end, a bundle of hollow fibers disposed in the enclosure, and at least one partition disposed in the end;
    at least one cover for closing the end of the body; and
    means for providing leakproofness to the apparatus, which substantially avoids the formation of deposits such as coagulated blood and/or fibrin at the periphery of the bundle of during operation, including at least one seal having a concave-shaped surface joining, in a substantially continuous manner, the body to the cover.

2. The hollow fiber apparatus according to claim 1 wherein the concave-shaped surface extends between the cover and the partition at a location near a periphery of the partition.

3. The hollow fiber apparatus according to claim 1 wherein the cover includes at least one annular rib on an inner surface thereof, and the partition includes at least one annular groove for receiving at least a portion of the annular rib, the seal between the cover and the partition including a polymerized resin-based material disposed in a gap between the rib and the groove.

4. The hollow fiber apparatus according to claim 3 wherein the groove has an inner wall closest to the fiber bundle and an opposing outer wall, and wherein the rib and the groove engage each other in an asymmetrical manner, a gap formed between an outer wall of the groove and the rib being narrower than a gap formed between the rib and an inner wall of the groove.

5. A hollow fiber apparatus according to claim 3 wherein the partition includes a first surface, a second surface projecting beyond the first surface, and a second annular rib located proximate the annular groove on a side of the annular groove nearest the periphery of the partition, the second annular rib projecting from the first surface to a position beneath a plane of the second surface.

6. The hollow fiber apparatus according to claim 3 wherein the partition and the seal are made of the same resin-based material.

7. The hollow fiber apparatus according to claim 3 wherein the resin-based material is biocompatible.

8. The hollow fiber apparatus according to claim 1 wherein the enclosure includes two ends, said at least one cover includes two covers, said at least one partition includes two partitions, and wherein one of each of said covers, partitions and seals are disposed at one end of the elongated body, and the other of each of said covers, partitions and seals are disposed at an opposite end of the elongated body.

9. The hollow fiber apparatus according to claim 1 wherein the seal joins the enclosure with the cover.

10. The hollow fiber apparatus according to claim 1 wherein the seal joins the partition with the cover.

11. The hollow fiber apparatus according to claim 1 wherein the enclosure includes an annular bearing surface and the cover includes a corresponding annular shoulder, the cover and the enclosure defining a gap therebetween, and wherein the seal includes a resin disposed in the gap, the resin, in a polymerized state, forming a leakproof seal between the enclosure and the cover.

12. The hollow fiber apparatus according to claim 11 wherein the resin holds the cover on the enclosure.

13. A method for manufacturing a hollow fiber apparatus having an elongated body including a partition, a bundle of hollow fibers located in the body, at least one circular groove on an outer surface of the body, and a cover having at least one circular rib on an inner surface thereof, the method comprising the step of:

providing a leakproof seal to the apparatus and avoiding the formation of deposits such as coagulated blood and/or fibrin at the periphery of the bundle during operation, the step including the substeps of:

pouring into the groove a dosed amount of resin-based material;

fitting the cover on the elongated body so that the rib engages the groove, thereby causing the resin-based material to overflow and wet the partition and the cover in areas proximate the groove, and to form a concave meniscus therebetween; and allowing the resin-based material to polymerize.

* * * * *